United States Patent
Wang et al.

(10) Patent No.: US 10,725,172 B2
(45) Date of Patent: Jul. 28, 2020

(54) METHOD AND DEVICE FOR IMAGING BY BISTATIC SYNTHETIC APERTURE RADAR

(71) Applicant: Institute of Electronics, Chinese Academy of Sciences, Beijing (CN)

(72) Inventors: Yu Wang, Beijing (CN); Heng Zhang, Beijing (CN); Yunkai Deng, Beijing (CN); Jiangwen Tang, Beijing (CN); Jili Wang, Beijing (CN); Ning Li, Beijing (CN); Chunhui Zhou, Beijing (CN)

(73) Assignee: INST. OF ELECTRONICS, CHINESE ACADEMY OF SCIENCES, Beijing (CN)

( * ) Notice: Subject to any disclaimer, the term of this patent is extended or adjusted under 35 U.S.C. 154(b) by 301 days.

(21) Appl. No.: 15/868,991

(22) Filed: Jan. 11, 2018

(65) Prior Publication Data
US 2018/0196136 A1 Jul. 12, 2018

(30) Foreign Application Priority Data
Jan. 11, 2017 (CN) .......................... 2017 1 0019315

(51) Int. Cl.
*G01S 13/90* (2006.01)
*G01S 13/00* (2006.01)

(52) U.S. Cl.
CPC .......... *G01S 13/904* (2019.05); *G01S 13/003* (2013.01); *G01S 13/9017* (2013.01); *G01S 13/9058* (2019.05)

(58) Field of Classification Search
CPC ............... G01S 13/003; G01S 13/9017; G01S 13/9035; G01S 13/904; G01S 13/9058
See application file for complete search history.

(56) References Cited

U.S. PATENT DOCUMENTS

2010/0039313 A1\* 2/2010 Morris .................... G01S 7/006
   342/25 F
2011/0012778 A1\* 1/2011 Nguyen .................. G01S 7/414
   342/25 A

FOREIGN PATENT DOCUMENTS

| CN | 101509976 A | 8/2009 |
| CN | 103913741 A | 7/2014 |
| EP | 2660623 B1 | 2/2016 |

OTHER PUBLICATIONS

Supplementary European Search Report in European application No. 18150156.0, dated Jun. 8, 2018.
(Continued)

*Primary Examiner* — Timothy X Pham
(74) *Attorney, Agent, or Firm* — Syncoda LLC; Feng Ma (57) ABSTRACT

Range-compressed data are determined by range-compressing echo data, and are set as first data to be decomposed by first decomposition. Starting from n=1, iteration is performed as follows. nth data to be decomposed are upsampled. nth decomposition is performed on the up-sampled data. Dependency on slant ranges between a reference point and sub-apertures before and after synthesis is determined. nth azimuth-synthesized data are acquired by performing, according to the dependency on the slant ranges, nth azimuth synthesis on data acquired by the nth decomposition. The nth azimuth-synthesized data are set as (n+1)th data to be decomposed by (n+1)th decomposition. The n is increased by 1. A next iteration is performed until the n reaches a positive integer N greater than 1. A focused image is acquired by performing azimuth focusing on the Nth azimuth-synthesized data by BP.

13 Claims, 6 Drawing Sheets

(56) References Cited

OTHER PUBLICATIONS

Hongtu Xie et al.: "Fast Time-Domain Imaging in Elliptical Polar Coordinate for General Bistatic VHF/UHF Ultra-Wideband SAR With Arbitrary Motion", IEEE Journal of selected Topics in Applied Earth Observations and Remote Sensing, vol. 8, No. 2, Feb. 1, 2015, pp. 879-895, XP011572911, ISSN: 1939-1404, DOI: 10.1109/JSTARS.2014.2347413.

Marc Rodriguez-Cassola et al.: "Efficient Time-Domain Image Formation with Precise Topography Accommodation for General Bistatic SAR Configurations", IEEE Transactions on Aerospace and Electronic Systems, vol. 47, No. 4, Oct. 1, 2011, pp. 2949-2966, XP011361657, ISSN: 0018-9251, DOI: 10.1109/TAES.2011.6034676.

Robert Wang et al.: "Double-Channel Bistatic SAR System With Spaceborne Illuminator for 2-D and 3-D SAR Remote Sensing", IEEE Transactions on Geoscience and Remote Sensing, vol. 51, No. 8, Aug. 1, 2013, pp. 4496-4507, XP011521743, ISSN: 0196-2892, DOI: 10.1109/TGRS.2013.2252908.

Joachim H. G. Ender et al.: "New aspects of bistatic SAR: processing and experiments", IEEE International Geoscience and Remote Sensing Symposium 2004, vol. 3, Sep. 20, 2004, pp. 1758-1762, XP010751953, ISBN: 978-0-7803-8742-3.

Wen-Bin Zhang et al.: "A Fast Backprojection Algorithm for Spotlight Mode Bi-SAR Imaging", Journal of Radars, vol. 2, No. 3, Sep. 1, 2013, pp. 357-366, XP055479568, ISSN: 2095-283X, DOI: 10.3724/ SP.J.1300.2013.13031.

Research on Fast Image Formation and Frequency Domain Model for the Bistatic SAR, issued on Apr. 15, 2016.

Bulk-FFBP: Fast Factorized Back-Projection Algorithm Based on Range Bulk Processing, issued on Sep. 13, 2016.

A Fast BackProjection (FBP) Algorithm for spotlight Mode Bistatic Synthetic Aperture Radar (Bi-SAR) Imaging, issued on Sep. 30, 2013.

\* cited by examiner

METHOD AND DEVICE FOR IMAGING BY BISTATIC SYNTHETIC APERTURE RADAR

CROSS-REFERENCE TO RELATED APPLICATIONS

This application claims priority to Chinese patent application 201710019315.4 filed on Jan. 11, 2017, the entire content of which is incorporated herein by reference.

BACKGROUND

BiSAR is a system for imaging by SAR with a receiver and a transmitter located respectively at different working platforms and a spatial baseline between the receiver system and the transmitter system. By separating a receiver from a transmitter, a BiSAR system may show an advantage over conventional monostatic SAR. By separating a receiver from a transmitter, configuration of one transmitter and multiple receivers may be implemented with a low hardware cost. Different bistatic imaging systems may be formed with various platforms for bearing a transmitter and a receiver. For example, a space-air borne BiSAR system may be formed with an orbiting spaceborne SAR transmitter and an airborne receiving platform. A spaceborne-ground BiSAR system with a fixed station may be formed by deploying a receiver at a fixed location. A BiSAR system may be formed with a binary spaceborne formation. For example, an orbiting German TanDEM-X system may acquire global precise digital information on elevation through a binary spaceborne formation. A baseline of a bistatic system may be configured flexibly. With a bistatic system, temporal decoherence and atmospheric effect in interference processing with monostatic SAR may be avoided. Therefore, a result of interference inversion acquired with a bistatic system may be improved over that with a monostatic SAR system.

SUMMARY

Imaging by BiSAR may be implemented in three modes as follows. In Azimuth Variant BiSAR, a transmitting platform may move at a velocity vector different from that at which a receiving platform moves, such as in space-air borne BiSAR. In azimuth invariant BiSAR, a transmitting platform may move at a velocity vector same as that at which a receiving platform moves, such as in binary airborne level-flight BiSAR. In BiSAR with a fixed station, either a transmitter or a receiver is at a fixed spatial location, such as in spaceborne-ground BiSAR with a fixed station, airborne-ground BiSAR with a fixed station, etc.

A focusing algorithm for BiSAR data may be a time-domain imaging algorithm, a frequency-domain imaging algorithm, etc. Time-domain imaging may apply to all the three modes of imaging by BiSAR, with an optimal quality of focusing. However, compared with frequency-domain imaging, such as a Range Doppler Algorithm (RDA), a Nonlinear Chirp Scaling Algorithm (NLCSA), etc., time-domain imaging is of great time complexity and requires a long time to focus. Frequency-domain imaging may not apply to the three modes of BiSAR.

The inventors of the present disclosure have recognized, therefore, there is a pressing need for a fast time-domain focusing algorithm developed using existing computer hardware to implement fast precise focusing of BiSAR data.

The present disclosure relates to Synthetic Aperture Radar (SAR), and in particular to a method and device for imaging by Bistatic Synthetic Aperture Radar (BiSAR). Embodiments disclosed herein provide a method and device for imaging by BiSAR, capable of implementing fast accurate focusing of BiSAR data.

A technical solution herein may be implemented as follows.

According to an embodiment herein, a method for imaging by Bistatic Synthetic Aperture Radar (BiSAR) includes:

determining range-compressed data by range-compressing echo data, and setting the range-compressed data as first data to be decomposed by first decomposition;

starting from n=1, performing an iteration of: up-sampling nth data to be decomposed, performing nth decomposition on the up-sampled data, determining dependency on a slant range between a reference point and a sub-aperture before synthesis and a slant range between the reference point and a sub-aperture after synthesis, acquiring nth azimuth-synthesized data by performing, according to the dependency on the slant ranges, nth azimuth synthesis on data acquired by the nth decomposition, and setting the nth azimuth-synthesized data as (n+1)th data to be decomposed by (n+1)th decomposition; increasing the n by 1, and performing a next iteration until the n reaches an N, the N being a positive integer greater than 1; and acquiring a focused image by performing azimuth focusing on the Nth azimuth-synthesized data by Back Projection (BP).

The determining range-compressed data by range-compressing echo data may include:

for echo data acquired by azimuth invariant BiSAR, acquiring the range-compressed data by performing Fourier Transform (FT) on the echo data and performing Inverse FT (IFT) on a product of data acquired by the FT and a frequency-domain matching filter function.

The determining range-compressed data by range-compressing echo data may include: for echo data acquired by BiSAR with a fixed station, acquiring the range-compressed data by performing the FT on the echo data and performing the IFT on a product of data acquired by the FT and data acquired by conjugate FT of satellite transmitted data received by synchronized antennae of a receiver on the ground.

The up-sampling nth data to be decomposed may include:

performing Fast Fourier Transform (FFT) on the nth data to be decomposed, and up-sampling data acquired by the FFT by zero padding.

The performing nth decomposition on the up-sampled data may include:

acquiring data of sub-apertures of a level 1 and more by performing the nth decomposition on the up-sampled data according to a preset nth level of sub-aperture decomposition, and determining a number of sub-apertures in data of sub-apertures of a level.

The determining dependency on a slant range between a reference point and a sub-aperture before synthesis and a slant range between the reference point and a sub-aperture after synthesis may include:

for BiSAR with a fixed station, determining a delay from the reference point to the sub-aperture before synthesis and a delay from the reference point to the sub-aperture after synthesis according to the slant range between the reference point and the sub-aperture before synthesis and the slant range between the reference point and the sub-aperture after synthesis, a slant range between the reference point and a receiver, a speed of light, and a coordinate of the reference point, and setting the delays as the dependency on the slant range between the reference point and the sub-aperture before synthesis and the slant range between the reference point and the sub-aperture after synthesis.

The determining dependency on a slant range between a reference point and a sub-aperture before synthesis and a slant range between the reference point and a sub-aperture after synthesis may include: for azimuth invariant BiSAR, determining the delay from the reference point to the sub-aperture before synthesis and the delay from the reference point to the sub-aperture after synthesis according to the slant range between the reference point and the sub-aperture before synthesis and the slant range between the reference point and the sub-aperture after synthesis and the speed of light, and setting the delays as the dependency on the slant range between the reference point and the sub-aperture before synthesis and the slant range between the reference point and the sub-aperture after synthesis.

The acquiring nth azimuth-synthesized data by performing, according to the dependency on the slant ranges, nth azimuth synthesis on data acquired by the nth decomposition may include:

acquiring the nth azimuth-synthesized data by selecting, from data of sub-apertures of a level 1 and more acquired by the nth decomposition according to the dependency on the slant range between the reference point and the sub-aperture before synthesis and the slant range between the reference point and the sub-aperture after synthesis, data of sub-apertures to be synthesized, and performing azimuth synthesis on the selected data of sub-apertures to be synthesized.

The acquiring a focused image by performing azimuth focusing on the Nth azimuth-synthesized data by BP may include:

acquiring the focused image by BiSAR by focusing the Nth azimuth-synthesized data via multithreaded time-domain BP imaging.

According to an embodiment herein, a device for imaging by BiSAR includes a range-compressing module, an azimuth-synthesizing module, and an azimuth-focusing module.

The range-compressing module is arranged for determining range-compressed data by range-compressing echo data. The range-compressed data are set as first data to be decomposed by first decomposition.

The azimuth-synthesizing module is arranged for: starting from n=1, performing an iteration of: up-sampling nth data to be decomposed, performing nth decomposition on the up-sampled data, determining dependency on a slant range between a reference point and a sub-aperture before synthesis and a slant range between the reference point and a sub-aperture after synthesis, acquiring nth azimuth-synthesized data by performing, according to the dependency on the slant ranges, nth azimuth synthesis on data acquired by the nth decomposition, and setting the nth azimuth-synthesized data as (n+1)th data to be decomposed by (n+1)th decomposition; increasing the n by 1, and performing a next iteration until the n reaches an N.

The azimuth-focusing module is arranged for: acquiring a focused image by performing azimuth focusing on the Nth azimuth-synthesized data by Back Projection (BP).

The range-compressing module may be arranged for: for echo data acquired by azimuth invariant BiSAR, acquiring the range-compressed data by performing FT on the echo data and performing IFT on a product of data acquired by the FT and a frequency-domain matching filter function. The range-compressing module may be arranged for: for echo data acquired by BiSAR with a fixed station, acquiring the range-compressed data by performing the FT on the echo data and performing the IFT on a product of data acquired by the FT and data acquired by conjugate FT of satellite transmitted data received by synchronized antennae of a receiver on the ground.

The azimuth-synthesizing module may be arranged for performing FFT on the nth data to be decomposed, and up-sampling data acquired by the FFT by zero padding. The azimuth-synthesizing module may be arranged for acquiring data of sub-apertures of a level 1 and more by performing the nth decomposition on the up-sampled data according to a preset nth level of sub-aperture decomposition, and determining a number of sub-apertures in data of sub-apertures of a level.

The azimuth-synthesizing module may be arranged for: for BiSAR with a fixed station, determining a delay from the reference point to the sub-aperture before synthesis and a delay from the reference point to the sub-aperture after synthesis according to the slant range between the reference point and the sub-aperture before synthesis and the slant range between the reference point and the sub-aperture after synthesis, a slant range between the reference point and a receiver, a speed of light, and a coordinate of the reference point. The delays may be the dependency on the slant range between the reference point and the sub-aperture before synthesis and the slant range between the reference point and the sub-aperture after synthesis.

The azimuth-synthesizing module may be arranged for: for azimuth invariant BiSAR, determining the delay from the reference point to the sub-aperture before synthesis and the delay from the reference point to the sub-aperture after synthesis according to the slant range between the reference point and the sub-aperture before synthesis and the slant range between the reference point and the sub-aperture after synthesis and the speed of light. The delays may be the dependency on the slant range between the reference point and the sub-aperture before synthesis and the slant range between the reference point and the sub-aperture after synthesis.

The azimuth-synthesizing module may be arranged for: acquiring the nth azimuth-synthesized data by selecting, from data of sub-apertures of a level 1 and more acquired by the nth decomposition according to the dependency on the slant range between the reference point and the sub-aperture before synthesis and the slant range between the reference point and the sub-aperture after synthesis, data of sub-apertures to be synthesized, and performing azimuth synthesis on the selected data of sub-apertures to be synthesized.

The azimuth-focusing module may be arranged for: acquiring the focused image by BiSAR by focusing the Nth azimuth-synthesized data via multithreaded time-domain BP imaging.

According to an embodiment herein, a device for imaging by BiSAR includes a processor and memory storing instructions executable by the processor for performing the method for imaging by BiSAR.

According to an embodiment herein, a non-transitory computer-readable storage medium has stored therein instructions that, when executed by a processor, cause the processor to perform the method for imaging by BiSAR.

With the method and device for imaging by BiSAR according to embodiments herein, range-compressed data are determined by range-compressing echo data. The range-compressed data are first data to be decomposed by first decomposition. Starting from n=1, an iteration is performed as follows. nth data to be decomposed are up-sampled. nth decomposition is performed on the up-sampled data. Dependency on a slant range between a reference point and a sub-aperture before synthesis and a slant range between the reference point and a sub-aperture after synthesis is determined. nth azimuth-synthesized data are acquired by performing, according to the dependency on the slant ranges, nth azimuth synthesis on data acquired by the nth decomposition. The nth azimuth-synthesized data are set as (n+1)th data to be decomposed by (n+1)th decomposition. The n is increased by 1, and a next iteration is performed until the n reaches the N. The N is a positive integer greater than 1. A focused image is acquired by performing azimuth focusing on the Nth azimuth-synthesized data by BP. In such a manner, the echo data are range-compressed. The range-compressed data are azimuth-decomposed and then azimuth-synthesized. Finally, azimuth focusing is performed on the azimuth-synthesized data, implementing fast accurate focusing of BiSAR data to acquire a well-focused image with efficiency, which is of low complexity and easy to implement.

DETAILED DESCRIPTION

According to embodiments herein, range-compressed data are determined by range-compressing echo data. The range-compressed data are set as first data to be decomposed by first decomposition. N iterations are performed. Starting from n=1, an iteration is performed as follows. nth data to be decomposed are up-sampled. nth decomposition is performed on the up-sampled data. Dependency on a slant range between a reference point and a sub-aperture before synthesis and a slant range between the reference point and a sub-aperture after synthesis is determined. nth azimuth-synthesized data are acquired by performing, according to the dependency on the slant ranges, nth azimuth synthesis on data acquired by the nth decomposition. The nth azimuth-synthesized data are set as (n+1)th data to be decomposed by (n+1)th decomposition. The n is increased by 1, and a next iteration is performed until the n reaches the N. The N is a positive integer greater than 1. Finally, a focused image is acquired by performing azimuth focusing on the Nth azimuth-synthesized data by BP.

Figure 1:
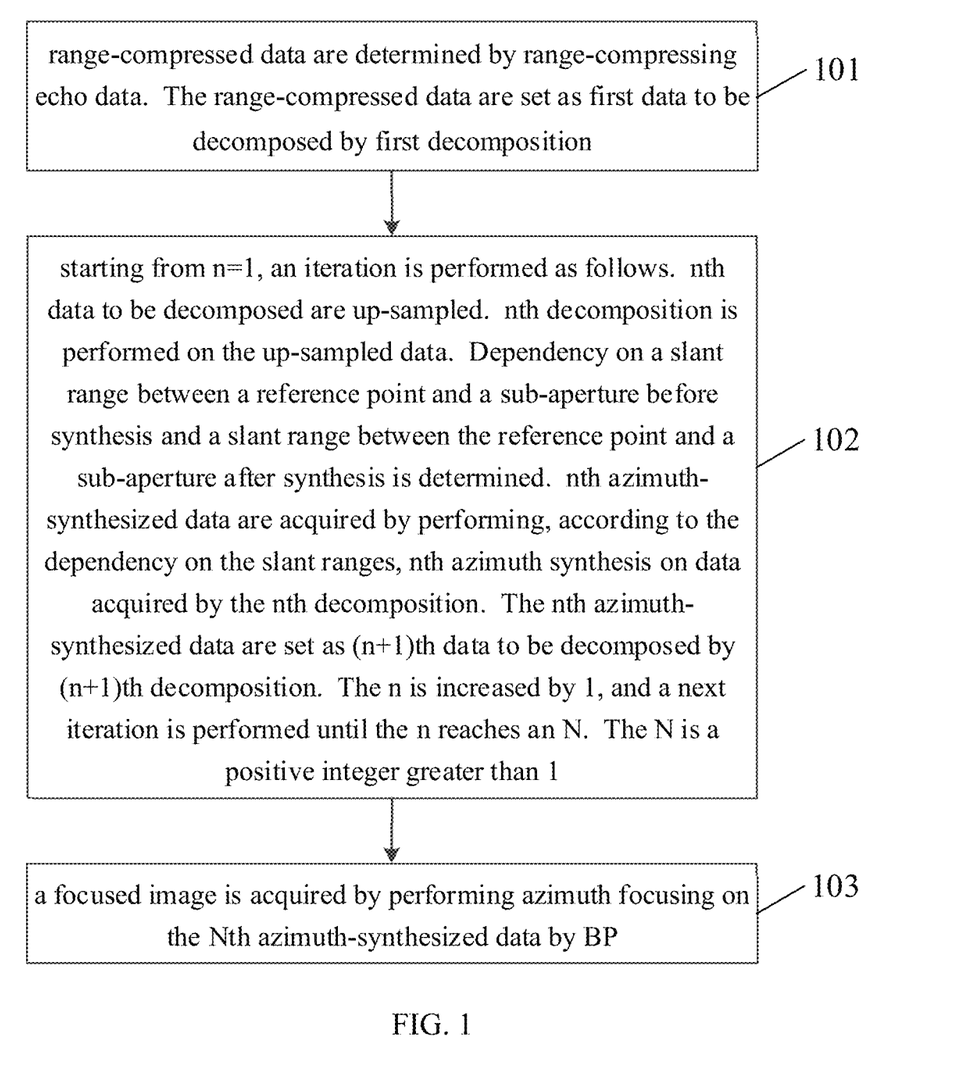
FIG. 1 is a flowchart of a method for imaging by BiSAR according to an embodiment herein.

As shown in FIG. 1, a flowchart of a method for imaging by BiSAR according to an embodiment herein includes steps as follows.

In step 101, range-compressed data are determined by range-compressing echo data. The range-compressed data are set as first data to be decomposed by first decomposition.

The range-compressed data may be determined by range-compressing the echo data via a matching filter according to a mode of imaging by BiSAR as follows.

For echo data acquired by azimuth invariant BiSAR, the range-compressed data may be acquired by performing Fourier Transform (FT) on the echo data and performing Inverse FT (IFT) on a product of data acquired by the FT and a frequency-domain matching filter function.

For echo data acquired by BiSAR with a fixed station, the range-compressed data may be acquired by performing the FT on the echo data and performing the IFT on a product of data acquired by the FT and data acquired by conjugate FT of satellite transmitted data received by synchronized antennae of a receiver on the ground.

Analysis may be performed respectively for azimuth invariant BiSAR and BiSAR with a fixed station, as follows.

For echo data acquired by azimuth invariant BiSAR, range compression may be performed by constructing a frequency-domain matching filter. The spectrum matching filter may be expressed by a formula (1) as follows.

$$S_c(t, \eta) = \mathcal{F}_t^{-1}\left\{\mathcal{F}_t\{S(t, \eta)\} \cdot \exp\left(j\pi \frac{f^2}{K_r}\right)\right\} \quad (1)$$

$$= p_r\left[t - \frac{L_R(\eta; \vec{r}) + L_T(\eta; \vec{r})}{c}\right]\exp\{-j4\pi f_0 L(\eta; \vec{r})/c\}$$

$\mathcal{F}_t$ may indicate FT. $\mathcal{F}_t^{-1}\{\ \}$ may indicate IFT. $S_c(t,\eta)$ may indicate a range-compressed time-domain signal. $S(t,\eta)$ may indicate an acquired radar echo signal. t may indicate a range time. $\eta$ may indicate an azimuth time. f may indicate a range frequency. $K_r$ may indicate a range chirp rate.

$$p_r\left[t - \frac{L_R(\eta; \vec{r}) + L_T(\eta; \vec{r})}{c}\right]$$

may indicate a range-compressed range envelope. $L_R$ may indicate a distance from an imaging point $\vec{r}$ to a receiver. $L_T$ may indicate a distance from the imaging point $\vec{r}$ to a transmitter. c may indicate the speed of light. $f_0$ may indicate a carrier frequency of a transmitted signal. $L(\eta; \vec{r})$ may indicate a sum of the distance from the imaging point to the receiver and the distance from the imaging point to the transmitter.

For echo data acquired by BiSAR with a fixed station, range compression may be performed by constructing a matching filter according to a pulse signal transmitted by a satellite and received by a direct-wave receiving antenna. The matching filter may be expressed by a formula (2) as follows.

$$S_c(t, \eta) = \mathcal{F}_t^{-1}\{\mathcal{F}_t\{S(t, \eta)\} \cdot \mathcal{F}_t\{S_D(t, \eta)\}\} \quad (2)$$

$$= p_r\left[t - \frac{L_R(\eta; \vec{r}) + L_T(\vec{r}) - L_D(\eta; \vec{r}_D)}{c}\right]\exp\{-j4\pi f_0 L(\eta; \vec{r})/c\}$$

$\mathcal{F}_t\{\ \}$ may indicate FT. $\mathcal{F}_t^{-1}\{\ \}$ may indicate IFT. $S_c(t,\eta)$ may indicate the range-compressed time-domain signal, $S(t,\eta)$ may indicate the acquired radar echo signal. $S_D(t,\eta)$ may indicate the pulse signal transmitted by the satellite and received by the direct-wave receiving antenna. t may indicate the range time. η may indicate the azimuth time.

$$p_r\left[t - \frac{L_R(\eta;\vec{r}) + L_T(\eta;\vec{r})}{c}\right]$$

may indicate the range-compressed range envelope. $L_R$ may indicate the distance from the imaging point $\vec{r}$ to the receiver. $L_T$ may indicate the distance from the imaging point $\vec{r}$ to the transmitter. $\vec{r}_D$ may indicate a location vector of the direct-wave receiving antenna. $L_D(\eta;\vec{r}_D)$ may indicate a distance from the direct-wave receiving antenna to the satellite when a satellite signal is transmitted. c may indicate the speed of light. $f_0$ may indicate the carrier frequency of the transmitted signal. $L(\eta;\vec{r})$ may indicate the sum of the distance from the imaging point to the receiver and the distance from the imaging point to the transmitter.

A target in a scene may correspond to a large echo width. After range compression has been performed on the echo data via the matching filter, a range location of a target imaging point may be identified.

In step 102, starting from n=1, an iteration is performed as follows. nth data to be decomposed are up-sampled. nth decomposition is performed on the up-sampled data. Dependency on a slant range between a reference point and a sub-aperture before synthesis and a slant range between the reference point and a sub-aperture after synthesis is determined. nth azimuth-synthesized data are acquired by performing, according to the dependency on the slant ranges, nth azimuth synthesis on data acquired by the nth decomposition. The nth azimuth-synthesized data are set as (n+1)th data to be decomposed by (n+1)th decomposition. The n is increased by 1, and a next iteration is performed until the n reaches an N. The N is a positive integer greater than 1.

The nth data to be decomposed may be up-sampled as follows.

FFT may be performed on the nth data to be decomposed. Data acquired by the FFT may be up-sampled by zero padding.

The nth data to be decomposed may be transformed (by FFT) into a range frequency domain. Data acquired by the FFT may be up-sampled by zero padding to increase a sampling rate.

The nth decomposition may be performed on the up-sampled data as follows.

Data of sub-apertures of a level 1 and more may be acquired by performing the nth decomposition on the up-sampled data according to a preset nth level of sub-aperture decomposition. A number of sub-apertures in data of sub-apertures of a level may be determined.

A level of sub-aperture decomposition may be an odd number or an even number. The level of sub-aperture decomposition may be an even number. The number of decompositions may be 4.

The preset level of sub-aperture decomposition may include, but is not limited to, an even number. The number of decompositions may include, but is not limited to, 4.

The dependency on the slant range between the reference point and the sub-aperture of a level may be determined according to a mode of imaging by BiSAR and whether a coordinate of the reference point is required, as follows.

For BiSAR with a fixed station, the coordinate(s) of the reference point may be required. A delay from the reference point to the sub-aperture before synthesis and a delay from the reference point to the sub-aperture after synthesis may be determined according to the slant range between the reference point and the sub-aperture before synthesis and the slant range between the reference point and the sub-aperture after synthesis, a slant range between the reference point and a receiver, a speed of light, and a coordinate of the reference point. The delays may be set as the dependency on the slant range between the reference point and the sub-aperture before synthesis and the slant range between the reference point and the sub-aperture after synthesis.

For azimuth invariant BiSAR, no coordinate of the reference point may be required. The delay from the reference point to the sub-aperture before synthesis and the delay from the reference point to the sub-aperture after synthesis may be determined according to the slant range between the reference point and the sub-aperture before synthesis and the slant range between the reference point and the sub-aperture after synthesis and the speed of light. The delays may be set as the dependency on the slant range between the reference point and the sub-aperture before synthesis and the slant range between the reference point and the sub-aperture after synthesis.

The location of the radar may be determined according to the sub-apertures before and after synthesis. The sub-aperture before synthesis and the sub-aperture after synthesis may indicate different locations of the radar. The slant range between the reference point and the sub-aperture before synthesis and the slant range between the reference point and the sub-aperture after synthesis may indicate slant ranges from the same reference point to different locations of the radar.

Figure 2:
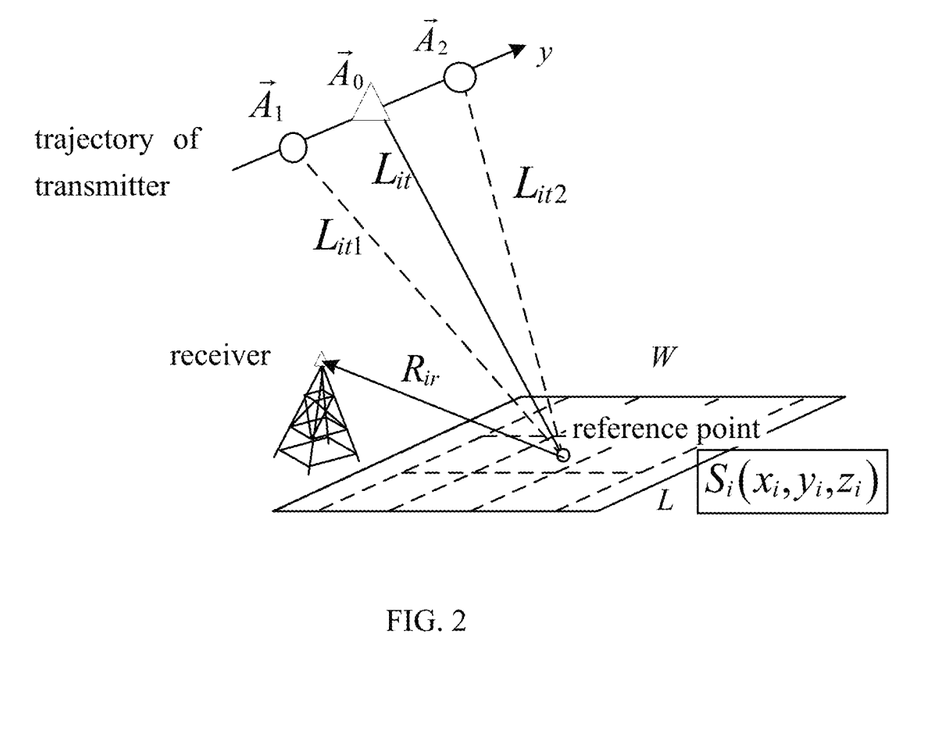
FIG. 2 is a diagram of determining dependency on a slant range between a reference point and a sub-aperture before synthesis and a slant range between the reference point and a sub-aperture after synthesis in BiSAR with a fixed station.
Figure 3:
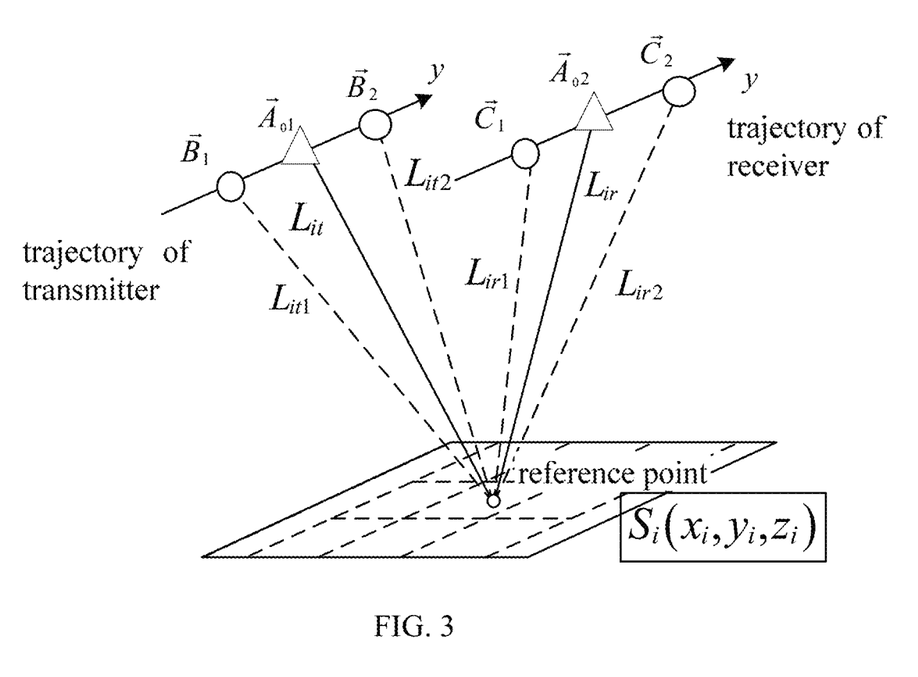
FIG. 3 is a diagram of determining dependency on a slant range between a reference point and a sub-aperture before synthesis and a slant range between the reference point and a sub-aperture after synthesis in azimuth invariant BiSAR.

The dependency on the slant range between the reference point and the sub-aperture before synthesis and the slant range between the reference point and the sub-aperture after synthesis may be determined for BiSAR with a fixed station, as shown in FIG. 2, and for azimuth invariant BiSAR, as shown in FIG. 3, respectively, as follows.

As shown in FIG. 2, for echo data acquired by BiSAR with a fixed station, a focal plane may be the ground. A size of a scene on the ground may be W×L, with N reference points. The W may indicate a width. The L may indicate a length.

A preset first level of sub-aperture decomposition may be 2. A coordinate of an ith reference point may be $S_i(x_i,y_i,z_i)$. $\vec{A}_1$ and $\vec{A}_2$ may indicate two sub-apertures to be synthesized. $\vec{A}_0$ may indicate a location of a new aperture after synthesis. The $\vec{A}_0$ may be selected as a point between the $\vec{A}_1$ and the $\vec{A}_2$.

A slant range $L_{iR}$ from the ith reference point $S_i$ to a platform bearing a receiver may be determined. A slant range $L_{itm}$ from the ith reference point $S_i$ to the first or second sub-aperture before synthesis may be determined. m=1, 2.

A delay from the ith reference point $S_i$ to a sub-aperture before synthesis and from the ith reference point $S_i$ to the receiver may be determined according to the slant range from the ith reference point $S_i$ to the first or second sub-aperture before synthesis and the slant range from the ith reference point $S_i$ to the receiver, as shown by a formula (3).

$$t_{im} = \frac{L_{itm} + L_{iR}}{c}, m = 1, 2 \qquad (3)$$

The $t_{im}$ may indicate a delay from the ith reference point $S_i$ to a sub-aperture $\vec{A}_m$ before synthesis and to the receiver. The $L_{itm}$ may indicate a slant range from the ith reference point $S_i$ to the mth sub-aperture before synthesis. The $L_{iR}$ may indicate the slant range from the ith reference point $S_i$ to the receiver. The c may indicate the speed of light.

A delay from the ith reference point $S_i$ to the new aperture $\vec{A}_0$ after synthesis and to the receiver may be determined by a formula (4).

$$t_i = \frac{L_{it} + L_{iR}}{c} \qquad (4)$$

The $t_i$ may indicate the delay from the ith reference point $S_i$ to the new aperture $\vec{A}_0$ after synthesis and to the receiver. The $L_{it}$ may indicate the slant range from the ith reference point $S_i$ to the new aperture $\vec{A}_0$ after synthesis. The $L_{iR}$ may indicate the slant range from the ith reference point $S_i$ to the receiver. The c may indicate the speed of light.

For a pair of corresponding delays $\{t_i, t_m\}$, the delay from the ith reference point $S_i$ to the sub-aperture before synthesis and the delay from the ith reference point to the sub-aperture after synthesis, namely, the dependency on the slant ranges, may be constructed using an interpolating kernel function to indicate projection between an echo delay of the new aperture $\vec{A}_0$ after synthesis and an echo delay of a sub-aperture $\vec{A}_m$ before synthesis, as shown by a formula (5).

$$I_m(t_i) = t_{im}, i=1,2, \ldots n_r; m=1,2 \qquad (5)$$

The $I_m()$ may indicate an interpolating kernel function.

The dependency on the slant range between the reference point and the sub-aperture before synthesis and the slant range between the reference point and the sub-aperture after synthesis may be acquired by interpolation.

There may be m=2 sub-apertures to be synthesized. The value of the m in the formulae (3) and (5) may be adjusted according to a number of sub-apertures to be synthesized. The number of sub-apertures to be synthesized may be determined according to a coefficient of sub-aperture synthesis.

As shown in FIG. 3, for echo data acquired by azimuth invariant BiSAR, A preset first level of sub-aperture decomposition may be 2. $\vec{B}_1$ and $\vec{B}_2$ may indicate locations of two sub-apertures to be synthesized on a trajectory of a transmitter. $\vec{A}_{01}$ may indicate a location of a new aperture after synthesis. The $\vec{A}_{01}$ may be selected as a point between the $\vec{B}_1$ and the $\vec{B}_2$ on the trajectory of the transmitter. $\vec{A}_{01}(x_1, y_1, z_1)$ may indicate coordinates of the new aperture $\vec{A}_{01}$ after synthesis.

$\vec{C}_1$ and $\vec{C}_2$ may indicate locations of two sub-apertures to be synthesized on a trajectory of a receiver. $\vec{A}_{02}$ may indicate a location of a new aperture after synthesis. The $\vec{A}_{02}$ may be selected as a point between the $\vec{C}_1$ and the $\vec{C}_2$ on the trajectory of the receiver. $\vec{A}_{02}(x_2, y_2, z_2)$ may indicate coordinates of the new aperture $\vec{A}_{02}$ after synthesis.

A slant range from an ith reference point $S_i$ to the synthesized sub-aperture $\vec{A}_{01}$ on the trajectory of the transmitter may be expressed by a formula (6).

$$R_{it} = \sqrt{(x_i - x_1)^2 + (y_i - y_1)^2 + (z_i - z_1)^2} \qquad (6)$$

A slant range from the ith reference point $S_i$ to the synthesized sub-aperture $\vec{A}_{02}$ on the trajectory of the receiver may be expressed by a formula (7).

$$R_{ir} = \sqrt{(x_i - x_2)^2 + (y_i - y_2)^2 + (z_i - z_2)^2} \qquad (7)$$

Since $y_1 = y_2 = y$, $z_1 = z_2 = z$, a sum of the slant range from the ith reference point $S_i$ to the synthesized sub-aperture $\vec{A}_{01}$ and the slant range from the ith reference point to the synthesized sub-aperture $\vec{A}_{02}$ may be expressed by a formula (8).

$$L_i = \sqrt{(x_i - x_1)^2 + (y_i - y)^2 + (z_i - z)^2} + \sqrt{(x_i - x_2)^2 + (y_i - y)^2 + (z_i - z)^2} \qquad (8)$$

A slant range from the ith reference point $S_i$ to a sub-aperture before synthesis on the trajectory of the transmitter or the receiver may be expressed by a formula (9).

$$L_{im} = \sqrt{(x_i - x_{1m}')^2 + (y_i - y_m')^2 + (z_i - z')^2} + \sqrt{(x_i - x_{2m}')^2 + (y_i - y_m')^2 + (z_i - z)^2} \, m=1,2 \qquad (9)$$

Since $x_1 = x_{1m}'$, $x_2 = x_{2m}'$, a delay for a signal to transmit between sub-apertures to be synthesized may be acquired according to the transmission slant range of the signal in the formula (9), as shown by a formula (10).

$$t_{jm} = \frac{L_{im}}{c}, m = 1, 2 \qquad (10)$$

Since $x_1 = x_{1m}'$, $x_2 = x_{2m}'$, a delay for a signal to transmit between sub-apertures after synthesis may be acquired according to the transmission slant range of the signal in the formula (8), as shown by a formula (11).

$$t_j = \frac{L_i}{c} \qquad (11)$$

$$c_1 = (y_i - y_1)^2 + (z_i - z_1)^2. \quad c_2 = (y_2 - y_i)^2 + (z_i - z_2)^2.$$

$$c_3 = x_1 - x_2.$$

A relationship between a range time $t_j$ and a range location $x_i$ of the ith reference point $S_i$ may be acquired according to the formulae (8) through (11), as shown by a formula (12).

$$x_i(t_j) = \frac{-b + \sqrt{b^2 - a \cdot d}}{2a} \qquad (12)$$

$$a = c_3^2 - (c \cdot t_j)^2$$

$$b = c_3[c_1 - c_2 + a]$$

$$d = c_1^2 + c_2^2 + a^2 - 2c_1(c_2 - a) - 2c_2[c_3^2 + (c \cdot t_j)^2]$$

Integrating (12) into (10) and (11) may give a relationship between the delay from the ith reference point $S_i$ to the sub-aperture before synthesis and the delay from the ith reference point to the sub-aperture after synthesis. Namely, an analytical delay $t_{jm}(t_j)$ from a reference point to the sub-aperture before and/or after synthesis may be expressed by a formula (13).

$$t_m(t_j)=t_{jm}, j=1,2,\ldots n_r; m=1,2 \quad (13)$$

The analytical delay $t_{jm}(t_j)$ may be referred to as the dependency on the slant range between the reference point and the sub-aperture before synthesis and the slant range between the reference point and the sub-aperture after synthesis.

The dependency on the slant range between the reference point and the sub-aperture before synthesis and the slant range between the reference point and the sub-aperture after synthesis may be acquired using an analytical expression.

There may be m=2 sub-apertures to be synthesized. The value of the m in the formulae (9), (10), and (13) may be adjusted according to a number of sub-apertures to be synthesized. The number of sub-apertures to be synthesized may be determined according to a coefficient of sub-aperture synthesis.

The nth azimuth-synthesized data may be acquired by performing, according to the dependency on the slant ranges, the nth azimuth synthesis on the data acquired by the nth decomposition as follows.

The nth azimuth-synthesized data may be acquired by selecting, from data of sub-apertures of a level 1 and more acquired by the nth decomposition according to the dependency on the slant range between the reference point and the sub-aperture before synthesis and the slant range between the reference point and the sub-aperture after synthesis, data of sub-apertures to be synthesized, and performing azimuth synthesis on the selected data of sub-apertures to be synthesized.

The dependency on the slant range between the reference point and the sub-aperture before synthesis and the slant range between the reference point and the sub-aperture after synthesis may be determined by determining dependency of the range location of the reference point on the range time. There is no change to a length of range data.

Azimuth synthesis may be implemented respectively for BiSAR with a fixed station and for azimuth invariant BiSAR as follows.

For BiSAR with a fixed station, FFT may be performed on the range-compressed data acquired In step 101 by range-compressing the echo data. Data acquired by the FFT may be up-sampled by zero padding. A sub-aperture to be synthesized may be selected according to a coefficient of sub-aperture synthesis same as a level of sub-aperture decomposition. Data from the synthesized new aperture $\vec{A}_0$ to the sub-aperture $\vec{A}_1$ before synthesis may be acquired according to the dependency $I_m(t)$ on the slant range between the reference point and the sub-aperture before synthesis and the slant range between the reference point and the sub-aperture after synthesis, as shown by a formula (14).

$$S_c(I_1(t),\eta)\exp\{-j2\pi f_0(I_1(t)-t)\} \quad (14)$$

Data from the new aperture after synthesis to the sub-aperture $\vec{A}_0$ before synthesis may be expressed by a formula (15).

$$S_c(I_2(t),\eta)\exp\{-j2\pi f_0(I_2(t)-t)\} \quad (15)$$

The azimuth-synthesized data, i.e., the data of the new aperture $\vec{A}_0$ after synthesis, may be acquired by coherent accumulation of the data of the two apertures $\vec{A}_1$ and $\vec{A}_2$ before synthesis. That is, the azimuth-synthesized data may be acquired by azimuth-synthesizing the data of the sub-apertures to be synthesized, by coherently accumulating the formulae (14) and (15), as shown by formula (16).

$$S1(t,\eta)=\sum_{i=1}^{2} S_c(I_m(t),\eta)\exp\{-j2\pi f_0(I_m(t)-t)\} \quad (16)$$

The $S1(t,\eta)$ may indicate a signal of the azimuth-synthesized data. The $f_0$ may indicate a carrier frequency.

A preset first level of sub-aperture decomposition may be 2. Data of sub-apertures of two levels may be acquired by performing the first decomposition on the data acquired by up-sampling the range-compressed data. A number of sub-apertures in data of sub-apertures of a level may be determined. The coefficient of sub-aperture synthesis may be identical to the level of sub-aperture decomposition. One sub-aperture may be selected respectively from the data of sub-apertures of the two levels. A new aperture may be acquired by synthesizing the selected sub-apertures. The azimuth-synthesized data may be acquired by azimuth-synthesizing data of the selected sub-apertures according to the formula (16) and the determined dependency on the slant range between the reference point and the sub-aperture before synthesis and the slant range between the reference point and the sub-aperture after synthesis.

For azimuth invariant BiSAR, FFT may be performed on the range-compressed data acquired In step 101 by range-compressing the echo data. Data acquired by the FFT may be up-sampled by zero padding. A sub-aperture to be synthesized may be selected according to the coefficient of sub-aperture synthesis and the level of sub-aperture decomposition. Data from the synthesized new aperture $\vec{A}_{01}$ on the trajectory of the transmitter to the sub-aperture $\vec{B}_1$ before synthesis may be acquired according to the dependency $I_m(t)$ on the slant range between the reference point and the sub-aperture before synthesis and the slant range between the reference point and the sub-aperture after synthesis, as shown by a formula (17).

$$S_c(t_1(t),\eta)\exp\{-j2\pi f_0(t_1(t)-t)\} \quad (17)$$

Data from the new aperture $\vec{A}_{01}$ after synthesis on the trajectory of the transmitter to the sub-aperture $\vec{B}_2$ before synthesis may be expressed by a formula (18).

$$S_c(t_2(t),\eta)\exp\{-j2\pi f_0(t_2(t)-t)\} \quad (18)$$

The azimuth-synthesized data, i.e., the data of the new aperture $\vec{A}_{01}$ after synthesis, may be acquired by coherent accumulation of the data of the two apertures $\vec{B}_1$ and $\vec{B}_2$ before synthesis. That is, the azimuth-synthesized data may be acquired by azimuth-synthesizing the data of the sub-apertures to be synthesized, by coherently accumulating the formulae (17) and (18), as shown by a formula (19).

$$S2(t,\eta)=\sum_{i=1}^{2} S_c(t_m(t),\eta)\exp\{-j2\pi f_0(t_m(t)-t)\} \quad (19)$$

The $S_2(t,\eta)$ may indicate a signal of the azimuth-synthesized data. The $f_0$ may indicate the carrier frequency.

Azimuth-synthesized data may be acquired by azimuth-synthesizing the data of the sub-apertures to be synthesized on the trajectory of the receiver using a formula same as that used to acquire the azimuth-synthesized data by azimuth-synthesizing the data of the sub-apertures to be synthesized on the trajectory of the transmitter, which will not be repeated here.

A preset first level of sub-aperture decomposition may be 2. Data of sub-apertures of two levels may be acquired by performing the first decomposition on the data acquired by up-sampling the range-compressed data. A number of sub-apertures in data of sub-apertures of a level may be determined. The coefficient of sub-aperture synthesis may be identical to the level of sub-aperture decomposition. One sub-aperture may be selected respectively from the data of sub-apertures of the two levels. A new aperture may be acquired by synthesizing the selected sub-apertures. The azimuth-synthesized data may be acquired by azimuth-synthesizing data of the selected sub-apertures according to the formula (19) and the determined dependency on the slant range between the reference point and a sub-aperture of a level.

Described in the step are but one decomposition and one synthesis. In general there may be more decomposition. Additional decomposition and synthesis may be done likewise, and thus will not be elaborated.

In step 103, a focused image is acquired by performing azimuth focusing on the Nth azimuth-synthesized data by BP.

The focused image may be acquired by performing azimuth focusing on the Nth azimuth-synthesized data by BP as follows. The focused image may be acquired by BiSAR by focusing the Nth azimuth-synthesized data via multi-threaded time-domain BP imaging.

With conventional BP imaging, a focused image may be implemented by BiSAR by range-compressing echo data and performing azimuth focusing on the range-compressed data, which may be time consuming. With an embodiment herein, first data to be decomposed may be acquired by range-compressing echo data. Then, N iterations of decomposition and azimuth synthesis may be performed. The Nth azimuth-synthesized data may be acquired by azimuth synthesizing data of sub-apertures of a level acquired by the Nth decomposition, and azimuth focusing may be performed on the Nth azimuth-synthesized data, such that fast focusing may be implemented to acquire a BiSAR image.

Figure 4:
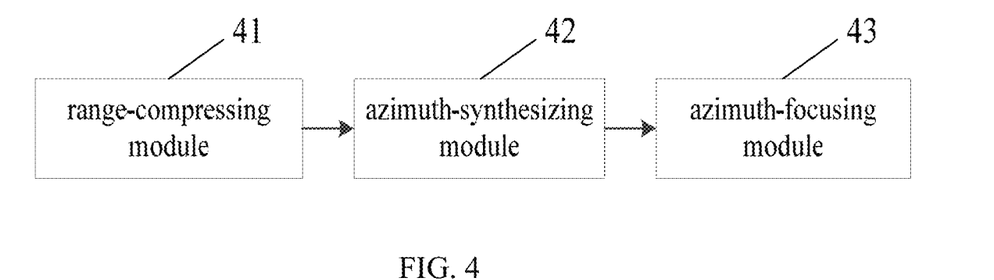
FIG. 4 is a diagram of a structure of a device for imaging by BiSAR according to an embodiment herein.

As shown in FIG. 4, to implement the method according to an embodiment herein, a device for imaging by BiSAR according to an embodiment herein includes a range-compressing module 41, an azimuth-synthesizing module 42, and an azimuth-focusing module 43.

The range-compressing module 41 is arranged for: determining range-compressed data by range-compressing echo data, and setting the range-compressed data as first data to be decomposed by first decomposition.

The azimuth-synthesizing module 42 is arranged for: starting from n=1, performing an iteration of: up-sampling nth data to be decomposed, performing nth decomposition on the up-sampled data, determining dependency on a slant range between a reference point and a sub-aperture before synthesis and a slant range between the reference point and a sub-aperture after synthesis, acquiring nth azimuth-synthesized data by performing, according to the dependency on the slant ranges, nth azimuth synthesis on data acquired by the nth decomposition, and setting the nth azimuth-synthesized data as (n+1)th data to be decomposed by (n+1)th decomposition; increasing the n by 1, and performing a next iteration until the n reaches an N.

The azimuth-focusing module 43 is arranged for: acquiring a focused image by performing azimuth focusing on the Nth azimuth-synthesized data by BP.

The range-compressing module 41 may be arranged for: for echo data acquired by azimuth invariant BiSAR, acquiring the range-compressed data by performing FT on the echo data and performing IFT on a product of data acquired by the FT and a frequency-domain matching filter function. The range-compressing module may be arranged for: for echo data acquired by BiSAR with a fixed station, acquiring the range-compressed data by performing the FT on the echo data and performing the IFT on a product of data acquired by the FT and data acquired by conjugate FT of satellite transmitted data received by synchronized antennae of a receiver on the ground.

The azimuth-synthesizing module 42 may be arranged for: performing FFT on the nth data to be decomposed, and up-sampling data acquired by the FFT by zero padding. The azimuth-synthesizing module may be arranged for: acquiring data of sub-apertures of a level 1 and more by performing the nth decomposition on the up-sampled data according to a preset nth level of sub-aperture decomposition, and determining a number of sub-apertures in data of sub-apertures of a level.

The preset level of sub-aperture decomposition may include, but is not limited to, an even number. The number of decompositions may include, but is not limited to, 4.

The azimuth-synthesizing module 42 may be arranged for: for BiSAR with a fixed station, determining a delay from the reference point to the sub-aperture before synthesis and a delay from the reference point to the sub-aperture after synthesis according to the slant range between the reference point and the sub-aperture before synthesis and the slant range between the reference point and the sub-aperture after synthesis, a slant range between the reference point and a receiver, a speed of light, and a coordinate of the reference point, and setting the delays as the dependency on the slant range between the reference point and the sub-aperture before synthesis and the slant range between the reference point and the sub-aperture after synthesis. The azimuth-synthesizing module may be arranged for: for azimuth invariant BiSAR, determining the delay from the reference point to the sub-aperture before synthesis and the delay from the reference point to the sub-aperture after synthesis according to the slant range between the reference point and the sub-aperture before synthesis and the slant range between the reference point and the sub-aperture after synthesis and the speed of light, and setting the delays as the dependency on the slant range between the reference point and the sub-aperture before synthesis and the slant range between the reference point and the sub-aperture after synthesis.

The location of the radar may be determined according to the sub-apertures before and after synthesis. The sub-aperture before synthesis and the sub-aperture after synthesis may indicate different locations of the radar. The slant range between the reference point and the sub-aperture before synthesis and the slant range between the reference point and the sub-aperture after synthesis may indicate slant ranges from the same reference point to different locations of the radar.

The azimuth-synthesizing module 42 may be arranged for: acquiring the nth azimuth-synthesized data by selecting, from data of sub-apertures of a level 1 and more acquired by the nth decomposition according to the dependency on the slant range between the reference point and the sub-aperture before synthesis and the slant range between the reference point and the sub-aperture after synthesis, data of sub-apertures to be synthesized, and performing azimuth synthesis on the selected data of sub-apertures to be synthesized.

The azimuth-focusing module 43 may be arranged for: acquiring the focused image by BiSAR by focusing the Nth azimuth-synthesized data via multithreaded time-domain BP imaging.

Each of the range-compressing module 41, the azimuth-synthesizing module 42, and the azimuth-focusing module 43 may be implemented by at least one of a Central Processing Unit (CPU), a Micro Processing Unit (MPU), a Digital Signal Processor (DSP), a Field—Programmable Gate Array (FPGA), etc., in the device for imaging by BiSAR.

Those skilled in the art may understand that all or part of the steps of the method may be completed by instructing a related hardware through a program. The program may be stored in a transitory or non-transitory computer-readable storage medium. The computer-readable storage medium may be Read-Only Memory (ROM), a magnetic disk, a CD, and/or the like. All or part of the steps in an aforementioned embodiment may be implemented using one or more Integrated Circuits. A unit or module in an aforementioned embodiment may be implemented in form of hardware or a software functional module. The present disclosure is not limited to any specific combination of hardware and software.

According to an embodiment herein, a device for imaging by BiSAR includes a processor and memory storing instructions executable by the processor for performing the method for imaging by BiSAR.

According to an embodiment herein, a non-transitory computer-readable storage medium has stored therein instructions that, when executed by a processor, cause the processor to perform the method for imaging by BiSAR.

The present disclosure is further elaborated below with reference to embodiments.

Figure 5:
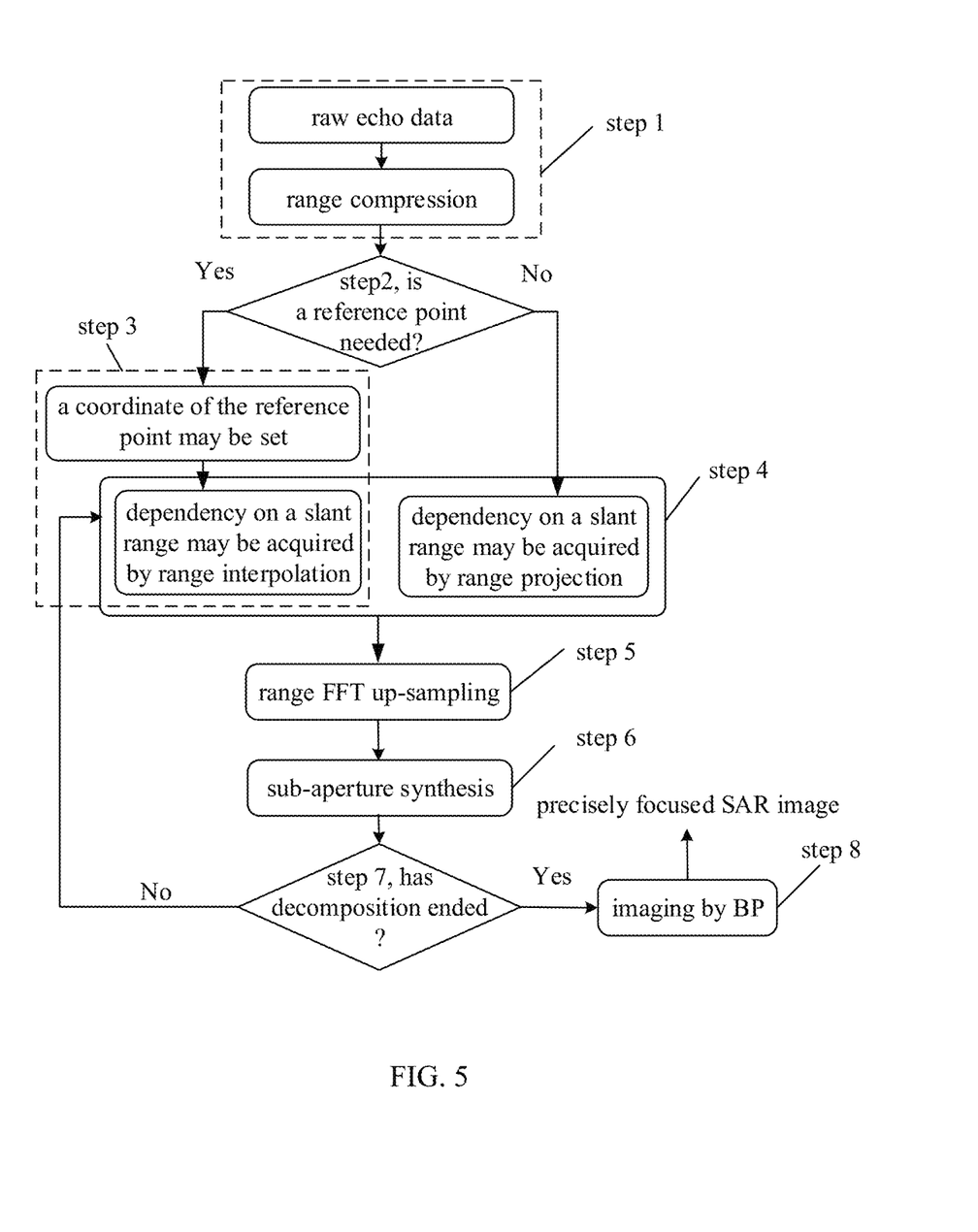
FIG. 5 is a flowchart of imaging by BiSAR according to an embodiment herein.

As shown in FIG. 5, a flowchart of imaging by BiSAR according to an embodiment herein may include steps as follows.

In step 1, range-compressed data may be determined by range-compressing echo data via a matching filter corresponding to a mode of imaging by BiSAR. The range-compressed data may be set as first data to be decomposed by first decomposition.

In step 2, it may be determined whether a coordinate of a reference point is required according to the mode of imaging by BiSAR. The flow may go to step 3 if the coordinate of the reference point is required. Otherwise, the flow may go to step 4.

In step 3, for BiSAR with a fixed station, the coordinate of the reference point may be set. Data of sub-apertures of a level 1 and more may be acquired by decomposing the up-sampled nth data to be decomposed according to a preset nth level of sub-aperture decomposition. A number of sub-apertures in data of sub-apertures of a level may be determined. Sub-apertures to be synthesized may be selected respectively from the decomposed data of sub-apertures of the level 1 and more according to a coefficient of sub-aperture synthesis same as a level of sub-aperture decomposition. A location of a synthesized new aperture may be determined according to locations of the sub-apertures to be synthesized. Dependency on a slant range between the reference point and a sub-aperture before synthesis and a slant range between the reference point and a sub-aperture after synthesis may be acquired by range interpolation. The flow may then go to step 5.

In step 4, for azimuth invariant BiSAR, the data of sub-apertures of the level 1 and more may be acquired by decomposing the up-sampled nth data to be decomposed according to the preset nth level of sub-aperture decomposition. The number of sub-apertures in the data of sub-apertures of a level may be determined. The sub-apertures to be synthesized may be selected respectively from the decomposed data of sub-apertures of the level 1 and more according to the coefficient of sub-aperture synthesis same as the level of sub-aperture decomposition. The location of the synthesized new aperture may be determined according to the locations of the sub-apertures to be synthesized. The dependency on the slant range between the reference point and the sub-aperture before synthesis and the slant range between the reference point and the sub-aperture after synthesis may be acquired by range projection. The flow may then go to step 5.

In step 5, FFT may be performed on the nth data to be decomposed. Data acquired by the FFT may be up-sampled by zero padding.

In step 6, the nth azimuth-synthesized data may be acquired by azimuth synthesizing data acquired by the nth decomposition according to the dependency on the slant ranges determined in step 3 or 4. The nth azimuth-synthesized data may be set as the (n+1)th data to be decomposed by the (n+1)th decomposition.

In step 7, it may be determined whether sub-aperture decomposition has ended. That is, it may be determined whether the n is equal to the N. The N may be a preset number of decompositions. The flow may go to step 8 if the sub-aperture decomposition has ended. Otherwise, the flow may go to step 3 or 4.

In step 8, an accurate focused image may be acquired by BiSAR by performing azimuth focusing on the Nth azimuth-synthesized data by BP.

Figure 6:
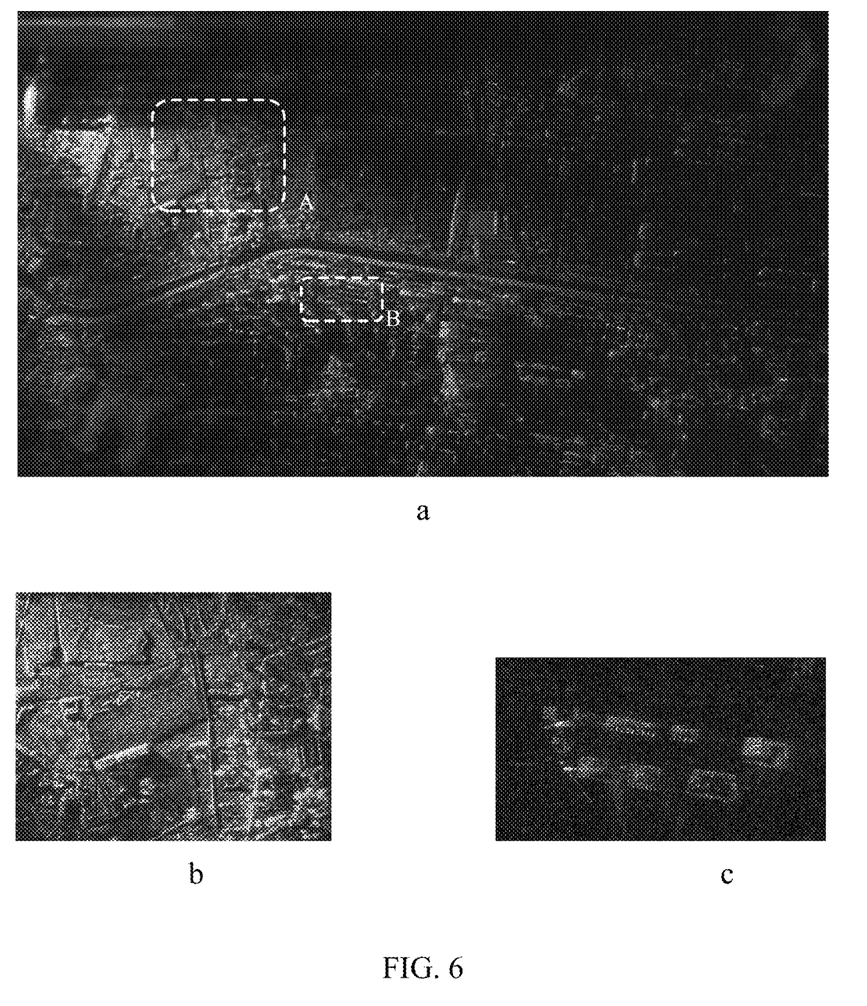
FIG. 6 is a result of imaging data measured by BiSAR in BiSAR with a fixed station and enlarged views of targets of highlight.

FIG. 6 is a diagram of a focusing result in imaging data measured by spaceborne-ground BiSAR with a fixed station. The diagram includes views a, b, and c. Enlarged views of typical areas A and B in view a are displayed. The area A may include a playground and vegetation. The area B may include buildings. It may be seen that the imaging by BiSAR may render good focusing.

Figure 7:
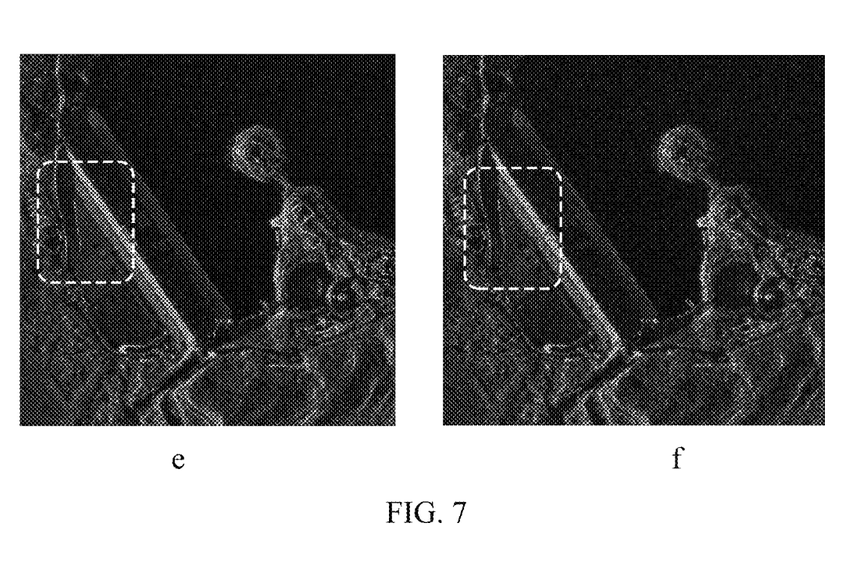
FIG. 7 is a diagram of a result of imaging data simulating azimuth invariant BiSAR.

FIG. 7 is a diagram of a focusing result in imaging data simulating azimuth invariant BiSAR. The diagram includes views e and f. The view e shows an image acquired by focusing with a conventional BP algorithm. The view f shows an image acquired by focusing with the present disclosure. It may be seen that the view f may render fair focusing comparable to that rendered by the view e.

What described are merely embodiments of the present disclosure, and are not intended to limit the scope of the present disclosure. Any modification, equivalent replacement, improvement, and/or the like made within the spirit and principle of the present disclosure should be included in the scope of the present disclosure.

The invention claimed is:

1. A method for imaging by Bistatic Synthetic Aperture Radar (BiSAR), comprising:
   determining range-compressed data by range-compressing echo data, and setting the range-compressed data as first data to be decomposed by first decomposition;
   starting from n=1, performing an iteration of: up-sampling nth data to be decomposed, performing nth decomposition on the up-sampled data, determining dependency on a slant range between a reference point and a sub-aperture before synthesis and a slant range between the reference point and a sub-aperture after synthesis, acquiring nth azimuth-synthesized data by performing, according to the dependency on the slant ranges, nth azimuth synthesis on data acquired by the nth decomposition, and setting the nth azimuth-synthesized data as (n+1)th data to be decomposed by (n+1)th decomposition; increasing the n by 1, and performing a next iteration until the n reaches an N, the N being a positive integer greater than 1; and acquiring a focused image by performing azimuth focusing on the Nth azimuth-synthesized data by Back Projection (BP), wherein the determining dependency on a slant range between a reference point and a sub-aperture before synthesis and a slant range between the reference point and a sub-aperture after synthesis comprises:

for BiSAR with a fixed station, determining a delay from the reference point to the sub-aperture before synthesis and a delay from the reference point to the sub-aperture after synthesis according to the slant range between the reference point and the sub-aperture before synthesis and the slant range between the reference point and the sub-aperture after synthesis, a slant range between the reference point and a receiver, a speed of light, and a coordinate of the reference point, and setting the delays as the dependency on the slant range between the reference point and the sub-aperture before synthesis and the slant range between the reference point and the sub-aperture after synthesis; and/or for azimuth invariant BiSAR, determining the delay from the reference point to the sub-aperture before synthesis and the delay from the reference point to the sub-aperture after synthesis according to the slant range between the reference point and the sub-aperture before synthesis and the slant range between the reference point and the sub-aperture after synthesis and the speed of light, and setting the delays as the dependency on the slant range between the reference point and the sub-aperture before synthesis and the slant range between the reference point and the sub-aperture after synthesis.

2. The method according to claim 1, wherein the determining range-compressed data by range-compressing echo data comprises:

for echo data acquired by azimuth invariant BiSAR, acquiring the range-compressed data by performing Fourier Transform (FT) on the echo data and performing Inverse FT (IFT) on a product of data acquired by the FT and a frequency-domain matching filter function; and/or for echo data acquired by BiSAR with a fixed station, acquiring the range-compressed data by performing the FT on the echo data and performing the IFT on a product of data acquired by the FT and data acquired by conjugate FT of satellite transmitted data received by synchronized antennae of a receiver on the ground.

3. The method according to claim 1, wherein the up-sampling nth data to be decomposed comprises:

performing Fast Fourier Transform (FFT) on the nth data to be decomposed, and up-sampling data acquired by the FFT by zero padding.

4. The method according to claim 1, wherein the performing nth decomposition on the up-sampled data comprises:

acquiring data of sub-apertures of a level 1 and more by performing the nth decomposition on the up-sampled data according to a preset nth level of sub-aperture decomposition, and determining a number of sub-apertures in data of sub-apertures of a level.

5. The method according to claim 1, wherein the acquiring nth azimuth-synthesized data by performing, according to the dependency on the slant ranges, nth azimuth synthesis on data acquired by the nth decomposition comprises:

acquiring the nth azimuth-synthesized data by selecting, from data of sub-apertures of a level 1 and more acquired by the nth decomposition according to the dependency on the slant range between the reference point and the sub-aperture before synthesis and the slant range between the reference point and the sub-aperture after synthesis, data of sub-apertures to be synthesized, and performing azimuth synthesis on the selected data of sub-apertures to be synthesized.

6. The method according to claim 1, wherein the acquiring a focused image by performing azimuth focusing on the Nth azimuth-synthesized data by BP comprises:

acquiring the focused image by BiSAR by focusing the Nth azimuth-synthesized data via multithreaded time-domain BP imaging.

7. A device for imaging by Bistatic Synthetic Aperture Radar (BiSAR), comprising:

a processor; and memory storing instructions executable by the processor, wherein the processor is arranged for:

determining range-compressed data by range-compressing echo data, and setting the range-compressed data as first data to be decomposed by first decomposition;

starting from n=1, performing an iteration of: up-sampling nth data to be decomposed, performing nth decomposition on the up-sampled data, determining dependency on a slant range between a reference point and a sub-aperture before synthesis and a slant range between the reference point and a sub-aperture after synthesis, acquiring nth azimuth-synthesized data by performing, according to the dependency on the slant ranges, nth azimuth synthesis on data acquired by the nth decomposition, and setting the nth azimuth-synthesized data as (n+1)th data to be decomposed by (n+1)th decomposition; increasing the n by 1, and performing a next iteration until the n reaches an N, the N being a positive integer greater than 1; and acquiring a focused image by performing azimuth focusing on the Nth azimuth-synthesized data by Back Projection (BP), wherein the processor is arranged for:

for BiSAR with a fixed station, determining a delay from the reference point to the sub-aperture before synthesis and a delay from the reference point to the sub-aperture after synthesis according to the slant range between the reference point and the sub-aperture before synthesis and the slant range between the reference point and the sub-aperture after synthesis, a slant range between the reference point and a receiver, a speed of light, and a coordinate of the reference point, and setting the delays as the dependency on the slant range between the reference point and the sub-aperture before synthesis and the slant range between the reference point and the sub-aperture after synthesis; and/or for azimuth invariant BiSAR, determining the delay from the reference point to the sub-aperture before synthesis and the delay from the reference point to the sub-aperture after synthesis according to the slant range between the reference point and the sub-aperture before synthesis and the slant range between the reference point and the sub-aperture after synthesis and the speed of light, and setting the delays as the dependency on the slant range between the reference point and the sub-aperture before synthesis and the slant range between the reference point and the sub-aperture after synthesis.

8. The device according to claim 7, wherein the processor is arranged for:
for echo data acquired by azimuth invariant BiSAR, acquiring the range-compressed data by performing Fourier Transform (FT) on the echo data and performing Inverse FT (IFT) on a product of data acquired by the FT and a frequency-domain matching filter function; and/or
for echo data acquired by BiSAR with a fixed station, acquiring the range-compressed data by performing the FT on the echo data and performing the IFT on a product of data acquired by the FT and data acquired by conjugate FT of satellite transmitted data received by synchronized antennae of a receiver on the ground.

9. The device according to claim 7, wherein the processor is arranged for:
performing Fast Fourier Transform (FFT) on the nth data to be decomposed, and up-sampling data acquired by the FFT by zero padding.

10. The device according to claim 7, wherein the processor is arranged for:
acquiring data of sub-apertures of a level 1 and more by performing the nth decomposition on the up-sampled data according to a preset nth level of sub-aperture decomposition, and determining a number of sub-apertures in data of sub-apertures of a level.

11. The device according to claim 7, wherein the processor is arranged for:
acquiring the nth azimuth-synthesized data by selecting, from data of sub-apertures of a level 1 and more acquired by the nth decomposition according to the dependency on the slant range between the reference point and the sub-aperture before synthesis and the slant range between the reference point and the sub-aperture after synthesis, data of sub-apertures to be synthesized, and performing azimuth synthesis on the selected data of sub-apertures to be synthesized.

12. The device according to claim 7, wherein the processor is arranged for:
acquiring the focused image by BiSAR by focusing the Nth azimuth-synthesized data via multithreaded time-domain BP imaging.

13. A non-transitory computer-readable storage medium having stored therein instructions that, when executed by a processor, cause the processor to perform a method for imaging by Bistatic Synthetic Aperture Radar (BiSAR), the method comprising:

determining range-compressed data by range-compressing echo data, and setting the range-compressed data as first data to be decomposed by first decomposition;
starting from n=1, performing an iteration of: up-sampling nth data to be decomposed, performing nth decomposition on the up-sampled data, determining dependency on a slant range between a reference point and a sub-aperture before synthesis and a slant range between the reference point and a sub-aperture after synthesis, acquiring nth azimuth-synthesized data by performing, according to the dependency on the slant ranges, nth azimuth synthesis on data acquired by the nth decomposition, and setting the nth azimuth-synthesized data as (n+1)th data to be decomposed by (n+1)th decomposition; increasing the n by 1, and performing a next iteration until the n reaches an N, the N being a positive integer greater than 1; and
acquiring a focused image by performing azimuth focusing on the Nth azimuth-synthesized data by Back Projection (BP),
wherein the determining dependency on a slant range between a reference point and a sub-aperture before synthesis and a slant range between the reference point and a sub-aperture after synthesis comprises:
for BiSAR with a fixed station, determining a delay from the reference point to the sub-aperture before synthesis and a delay from the reference point to the sub-aperture after synthesis according to the slant range between the reference point and the sub-aperture before synthesis and the slant range between the reference point and the sub-aperture after synthesis, a slant range between the reference point and a receiver, a speed of light, and a coordinate of the reference point, and setting the delays as the dependency on the slant range between the reference point and the sub-aperture before synthesis and the slant range between the reference point and the sub-aperture after synthesis; and/or
for azimuth invariant BiSAR, determining the delay from the reference point to the sub-aperture before synthesis and the delay from the reference point to the sub-aperture after synthesis according to the slant range between the reference point and the sub-aperture before synthesis and the slant range between the reference point and the sub-aperture after synthesis and the speed of light, and setting the delays as the dependency on the slant range between the reference point and the sub-aperture before synthesis and the slant range between the reference point and the sub-aperture after synthesis.

* * * * *